United States Patent [19]
Sakai

[11] 3,717,439
[45] Feb. 20, 1973

[54] VAPOUR PHASE REACTION APPARATUS

[75] Inventor: Ryoichi Sakai, Yokohama, Japan

[73] Assignee: Tokyo Shibaura Electric Co., Ltd., Kawasaki-shi, Japan

[22] Filed: Nov. 18, 1970

[21] Appl. No.: 90,642

[52] U.S. Cl. .................23/277 R, 23/284, 23/252 R, 219/385, 219/552, 338/217, 13/22, 13/25, 118/49.1, 117/106 A, 148/175

[51] Int. Cl. ............................C23c 13/08, B01j 6/00

[58] Field of Search .....23/277 R, 284, 252 R, 223.5, 23/182 V; 219/385, 552; 338/217; 13/22, 25; 118/48–49.5; 117/106–107.2; 148/175

[56] References Cited

UNITED STATES PATENTS

| | | | |
|---|---|---|---|
| 3,293,074 | 12/1966 | Nickl | 23/223.5 X |
| 3,365,336 | 1/1968 | Folkmann et al | 148/175 |
| 3,189,494 | 6/1965 | Short | 148/175 |
| 3,381,114 | 4/1968 | Sho Nakanuma | 118/49.5 X |

*Primary Examiner*—James H. Tayman, Jr.
*Attorney*—Flynn & Frishauf

[57] ABSTRACT

A reaction chamber having a bottom which is a wafer mount and dome member; a plurality of gas inlet pipes positioned at the lower part of the reaction chamber for introducing gas into the reaction chamber so as to cause streams of gas therein to whirl along the inner wall of said chamber; an exhaust for expelling waste gas from the lower part of the vortex center of whirling gas in the reaction chamber; and heating means provided outside of the reaction chamber for its heating. The reaction chamber preferably contains a reaction gas inlet pipe having its opening positioned upwardly facing the upper central part of the inner wall of said done member.

4 Claims, 3 Drawing Figures

VAPOUR PHASE REACTION APPARATUS

The present invention relates to a vapour phase reaction apparatus and more particularly to an apparatus adapted to cause reaction gas effectively to act on the surface of, for example, a semiconductor substrate.

Where there is formed, for example, a silicon dioxide layer on the surface of a semiconductor substrate, there has often been used a direct oxidation process or thermal oxidation process as commonly so called which comprises heating a silicon substrate to a temperature of 1,000° to 1,300°C in an oxidizing atmosphere. However, said thermal oxidation process has various drawbacks, for example:

a. there occurs redistribution of impurities in the silicon substrate;

b. unless silicon or silicon dioxide is exposed on the surface of the silicon substrate, a silicon dioxide layer fails to be formed on said surface; and c. there most likely arises a phenomenon generally known as outdiffusion which leads to a decline in the concentration of impurities in the desired conductive regions of, for example, P or N prepared in advance by diffusion of impurities from the surface of the silicon substrate, particularly in the concentration of impurities near said surface.

These events have often resulted in degradation of the electrical properties of active and passive elements included in a transistor, diode or integrated circuit which were prepared by the aforementioned thermal oxidation process.

To eliminate such defects of the thermal oxidation process, there is employed a chemical process which consists in externally depositing a silicon dioxide layer on the surface of a semiconductor substrate by chemical reaction, for example, by thermal decomposition of organosilane, vapour phase reaction of carbon dioxide, or chemical reaction of silane ($SiH_4$) and oxygen ($O_2$).

The above-mentioned chemical process of externally depositing a silicon dioxide layer by chemical reaction on the surface of a semiconductor substrate has indeed the advantages:

a. there is made no discrimination between the kinds of material constituting a semiconductor substrate; and b. a silicon dioxide layer can be deposited on the surface of a semiconductor substrate even at a relatively low temperature of 300° to 900°C, effectively preventing the redistribution of impurities in the semiconductor substrate and the appearance of the phenomenon of outdiffusion and minimizing the depletion of the surface of the semiconductor substrate.

However, this chemical process presents difficulties in cleaning a boundary between the semiconductor substrate and the silicon dioxide layer produced and uniformly forming said layer. The former problem, that is, the difficulty of cleaning said boundary may be resolved by carrying out in advance gas etching or heat treatment in hydrogen gas. The latter problem, namely, the difficulty of preparing a uniform silicon dioxide layer has not yet been fully settled despite various improvements in the reaction apparatus itself. Accordingly, the prior art vapour phase reaction apparatus for providing, for example, a uniform silicon dioxide layer is of complicated construction, resulting in not only a low operating efficiency due to frequent shutdowns resulting from failures but also involves complicated readjustment procedures. Further, the conventional vapour phase reaction apparatus is handicapped by the fact that there occur rather prominent variations in the thickness of silicon dioxide layer produced for each throughput as well as in its electrical properties.

The object of the present invention is to provide a vapour phase reaction apparatus of simple construction and capable of producing a semiconductor element in quantity, which enables a layer of, for example, silicon, oxides or nitrides of silicon to be deposited in vapour phase on the surface of a semiconductor substrate, for example, a silicon substrate with uniform thickness, composition and dimensional precision, and also permits the vapour phase etching of said substrate.

According to an aspect of the present invention, there is provided a vapour phase reaction apparatus adapted to prepare, for example, a semiconductor element comprising a wafer mount; a reaction chamber built on the mount; a reaction gas inlet pipe for conducting said gas to the upper part of the reaction chamber; a plurality of carrier gas ejecting pipes positioned at the lower part of the reaction chamber for introducing said gas into the reaction chamber so as to cause streams of reaction gas therein to whirl along the inner wall of said chamber; an exhaust for expelling waste gas from the vortex centre of whirling gas in the reaction chamber; and heating means provided outside of the reaction chamber for its heating.

This invention can be more fully understood from the following detailed description when taken in connection with the accompanying drawings, in which.

Figure 1:
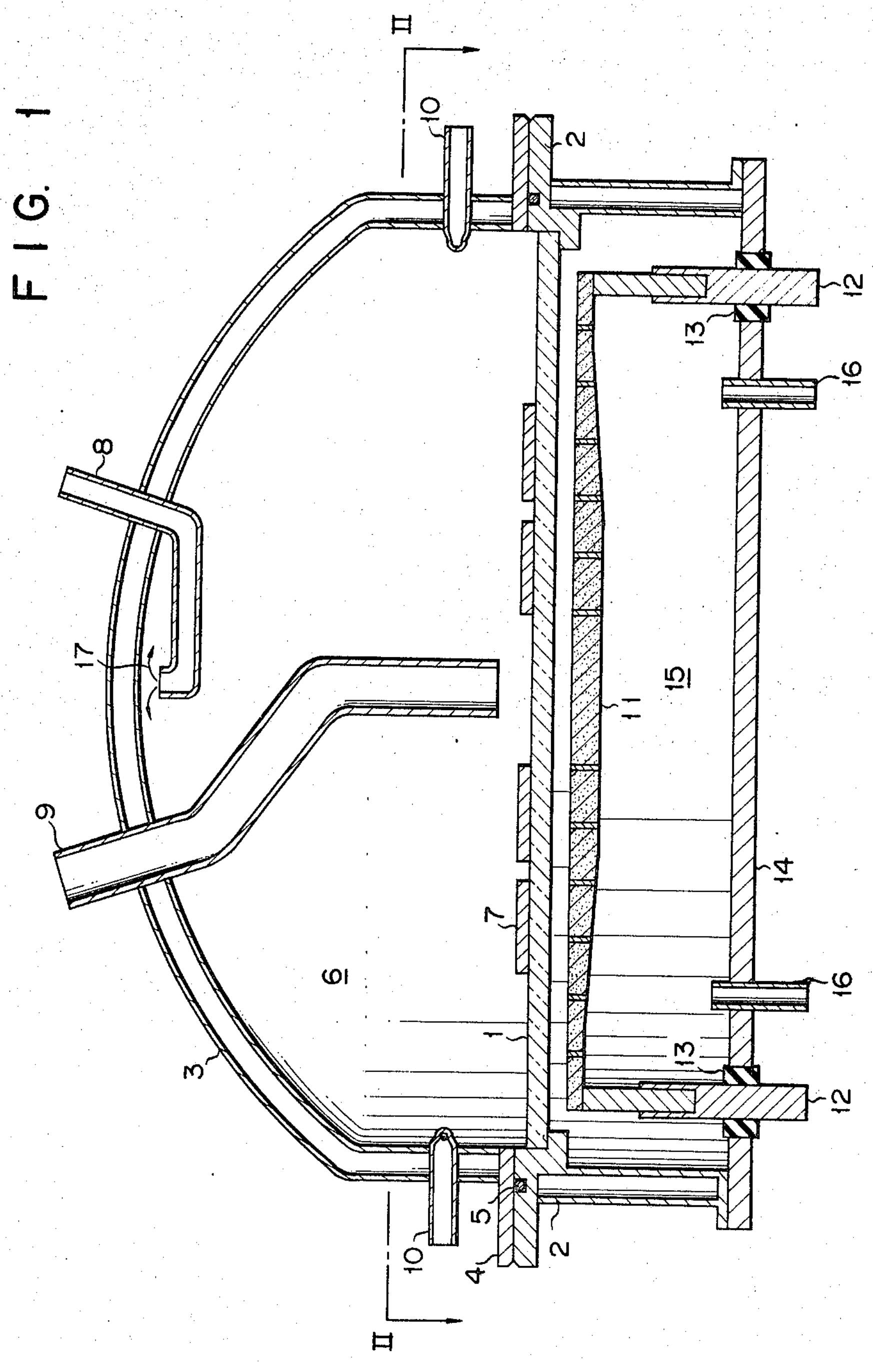
FIG. 1 is a sectional view of a vapour phase reaction apparatus according to an embodiment of the present invention.
Figure 2:
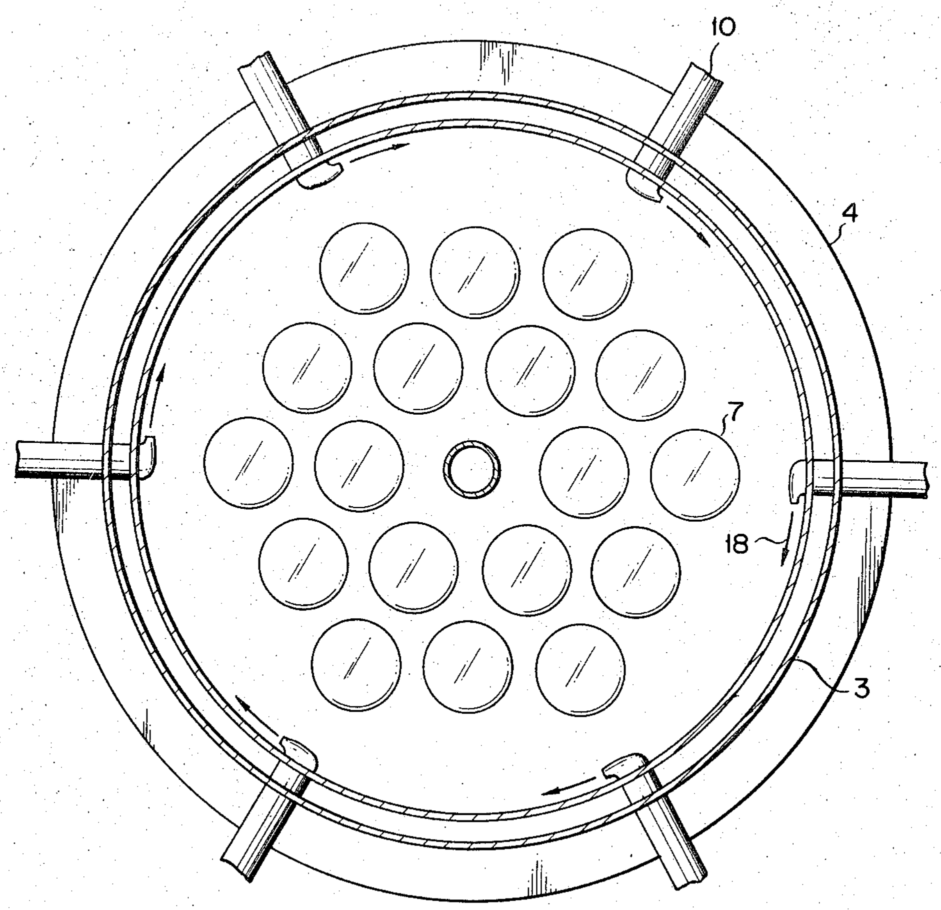
FIG. 2 is a sectional view on line II — II of FIG. 1 as viewed in the direction of the arrows.

There will now be described by reference to FIGS. 1 and 2 a vapour phase reaction apparatus according to an embodiment of the present invention. Numeral 1 denotes an externally heated wafer mount whose periphery is secured on a ring-shaped support 2. At the top of the support 2 is detachably mounted the flange 4 of a reaction chamber dome 3 by means of an O-ring 5 so as to set it in place. This dome 3, made of stainless steel, has a hollow cavity used for water cooling and a mirror-finished inner wall, the interior of said dome 3 being used as a reaction chamber 6. At that part of the mount 1 enclosed in said chamber 6 are arranged a plurality of annular rows of materials, for example, silicon substrates 7 which are to be subjected to vapour phase reaction, those in each annular row being disposed at a substantially equal distance from the mount centre. At the top of the dome 3 is disposed a penetrating reaction gas inlet pipe 8 whose inner end is turned upward near the centre of the upper inner wall of the dome 3. The reaction chamber 6 also contains a waste gas exhaust 9 whose lower end is positioned, for example, about 15 mm from the centre of the mount surface, and whose upper end portion penetrates the upper part of the dome 3, the body of the exhaust 9 being bent not to cross the inlet pipe 8. On the lower side wall of the dome 3 about 20 mm above the mount surface are radially arranged a plurality of carrier gas injecting pipes 10, as illustrated in FIG. 2 at a substantially equal peripheral interval in a manner to penetrate the dome wall. The nozzles of said pipes 10 are bent in the same direction in a horizontal plane. At least two, and preferably at least three, pipes 10 are required. Six pipes are used in the embodiment of FIGS. 1–2. Under the wafer mount 1 outside of the reaction chamber 6 is positioned a graphite heater 11 to heat the interior of the reaction chamber 6. The periphery of said heater 11 is supported by a water-cooled copper electrode 12. The graphite heater 11 which assumes a spiral shape is formed thin at the periphery and thick at the central part in consideration of heat dissipation. The copper electrode 12 is fixed to a base 14 through an insulating material 13. The heating chamber 15 defined between the base 14 and graphite heater 11 is supplied with heated gas, for example, $N_2$ and Ar through gas ducts 16 penetrating the base 14. That part of each support 2 which is defined between the wafer mount 1 and base 14 is made hollow so as to permit water cooling. The reaction chamber dome 3 may also be formed of quartz.

Where there is deposited by vapour growth, for example, a silicon dioxide layer on the surface of the silicon substrate 7 in a vapour phase reaction apparatus of the aforementioned construction, there is introduced a reaction gas such as $SiH_4$, $CO_2$ or $O_2$ mixed with a carrier gas through the reaction gas inlet pipe 8 as indicated by the arrows 17. Since the end opening of the reaction gas inlet pipe 8 is turned upward, the aforesaid gas mixture introduced into the reaction chamber through said end opening is carried along the inner wall of the spherical dome 3 and is uniformly distributed through the reaction chamber 6. However, to avoid the uneven formation of a silicon dioxide layer due to possible irregularities in the streams of reaction gas and carrier gas as well as in their mixed ratio, additional amounts of carrier gas are introduced through the nozzles of the carrier gas pipes 10 into the reaction chamber 6 along its inner wall in the direction indicated by the arrows 18 of FIG. 2, thereby forming a silicon dioxide layer by vapour growth on the silicon substrate while whirling the reaction gas and carrier gas together. Since the waste gas exhaust 9 sucks up waste gas from the vortex centre of the whirling gas mixture, said sucking does not disturb the streams of the reaction gas and carrier gas. Even where a silicon dioxide layer is externally deposited by chemical reaction on a silicon substrate, the vapour phase reaction apparatus of the present invention permits the uniform deposition of said layer. If there are placed silicon substrates 7 in a doughnut-shaped arrangement on the wafer mount 1 excluding the peripheral portion of said mount 1 which corresponds to a 10 mm wide annular area extending all along the edge of the graphite heater 11 and also the central portion of said mount 1 which outwardly extends 10 mm all around the bottom end of the waste gas outlet pipe 9, then there will be effected the prominently uniform formation of a silicon dioxide layer by vapour growth. It will be also possible to introduce only a reaction gas through the reaction inlet pipe 8 or a mixture of a reaction gas and carrier gas or additionally other gases through the carrier gas pipe 10.

The graphite heater 11 is provided separately outside of the reaction chamber 6, so that the heated gas $N_2$ which has been contaminated by impurities contained in the graphite does not intrude into the reaction chamber 6 nor does the graphite itself react with gases therein. Moreover, the mirror finish of the inner wall of the reaction chamber 6 enables deposits thereon to be easily cleaned off. Since the inner end of the inlet pipe 8 is bent toward the upper wall of the dome, the reaction gas conducted by the pipe 8 is ejected to said upper wall and impinges thereon uniformly to be uniformly distributed in the dome, whereby whirling of the carrier gas may not be prevented by the introduced reaction gas. Consequently the distribution of gas in the dome becomes uniform and thus a uniform reaction is attained.

Figure 3:
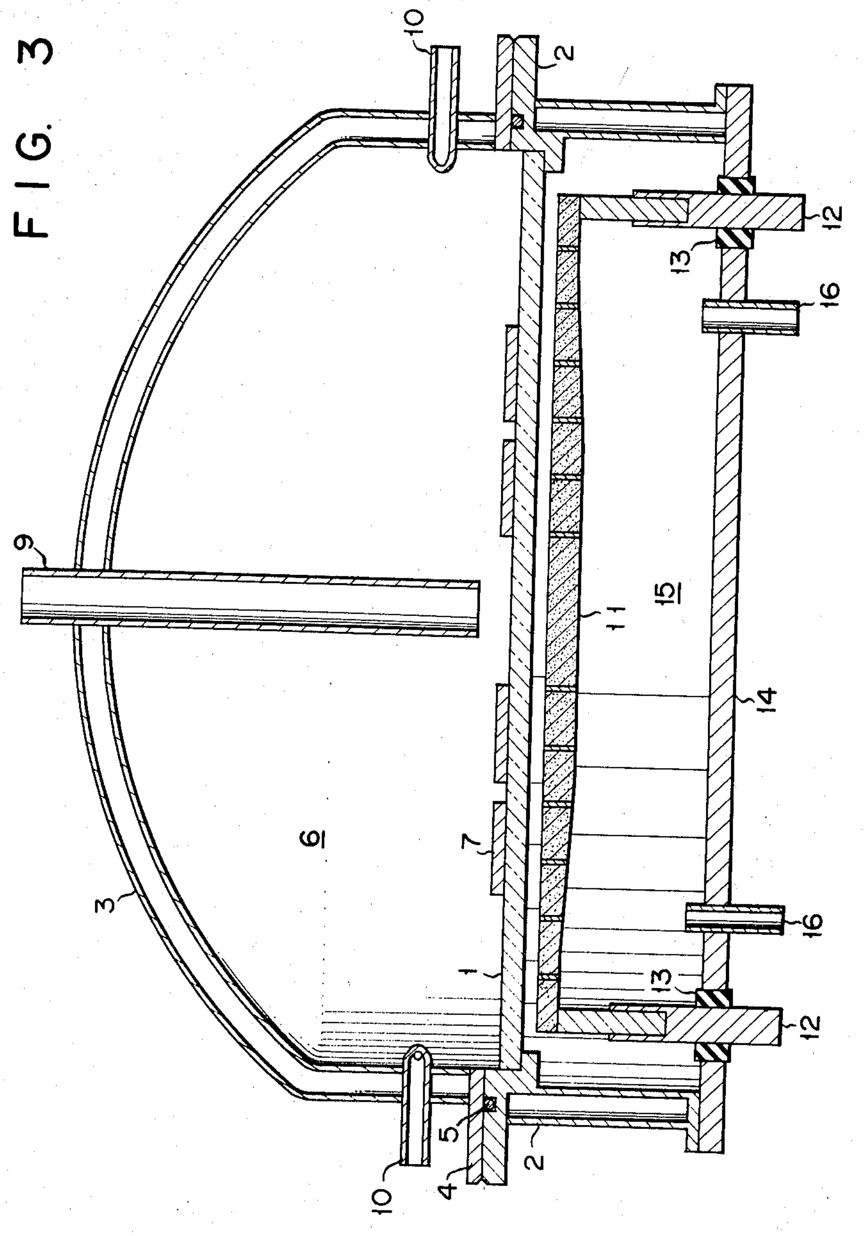
FIG. 3 is a sectional view of a vapour phase reaction apparatus according to another embodiment of the invention.

FIG. 3 shows a vapour phase reaction apparatus according to another embodiment of the present invention. The same parts of FIG. 3 as those of FIG. 1 are denoted by the same numerals and description thereof is omitted. In the embodiment of FIG. 3, there is eliminated the reaction gas inlet pipe 8 used in FIG. 1, and instead there is introduced a mixture of reaction gas and carrier gas through the carrier gas injecting pipes 10. The embodiment of FIG. 3 represents substantially the same effect as realized by that of FIGS. 1 and 2.

There will now be described the examples where there was deposited by vapour growth a silicon dioxide layer on a silicon substrate through chemical reaction of silane ($SiH_4$) and oxygen ($O_2$), using the vapour phase reaction apparatus of the present invention shown in FIGS. 1 and 2. The wafer mount 1 consisted of a quartz plate. On the quartz plate there were placed 18 silicon substrates 50 mm in diameter. From the reaction gas inlet pipe 8 above were introduced 3 % $SiH_4$ at the flow rate of 30 liters per hour, $O_2$ at 20 l/h and $N_2$ or Ar at 1,500 l/h. From the carrier gas ejecting pipes 10 below there was brought in $N_2$ or Ar at 750 l/h. Where the ejecting velocity was set at 50 cm/sec, the silicon substrate was heated to 480°C, and waste gas was expelled through the waste gas exhaust 9 to such extent that the pressure within the reaction chamber 6 was maintained at atmospheric, then variations in the thickness of a silicon dioxide layer deposited on the silicon substrate could be limited to $\pm 3$ percent max. for each throughput and $\pm 2$ percent max. in the same region of the substrate surface. When a silicon nitride layer was formed from $SiH_4$ and $NH_3$, the thickness of said layer presented substantially the same variations as in the case of the silicon dioxide layer.

There will now be described another example where the vapour phase reaction apparatus of the present invention was used in the vapour phase etching of a semiconductor substrate by anhydrous hydrogen chloride gas. From the reaction gas inlet pipe 8 was introduced HCl at the flow rate of 80 l/h, and from the carrier gas ejecting pipes 10 $N_2$ or Ar at 2,000 l/h. When the semiconductor substrate was heated to 1,200°C, there was obtained a far better result than was possible with a similar apparatus of the prior art. Further, the vapour phase reaction apparatus of the present invention is also applicable in the vapour phase growth of silicon by thermal decomposition of silane ($SiH_4$) as well as by hydrogen reduction of $SiCl_4$.

There will now be described still another example using the vapour phase reaction apparatus of FIG. 3, wherein there was only employed the carrier gas pipes 10 in introducing a reaction gas and carrier gas into the reaction chamber 6. The exhaust 9 is formed straightly. There were brought in $N_2$ at the flow rate of 2,000 l/h, 3 percent $SiH_4$ at 36 l/h and $O_2$ at 20 l/h. Though, in this case, a silicon dioxide layer produced presented a slightly less uniformity of thickness than with using the embodiment of FIGS. 1 and 2, there was obtained substantially the same result using the more simplified structure.

If a silicon substrate is subjected to vapour phase etching in the vapour phase reaction apparatus employed in the foregoing examples so as to expose a clean surface and there is formed by continuous process a silicon dioxide or silicon nitride layer by vapour phase growth on said surface, then there will be obtained a prominently stable MOSFET.

What is claimed is:

1. A vapour phase reaction apparatus comprising:

a reaction chamber including a bottom surface adapted to receive wafers thereon and a generally domed shaped member covering said bottom surface;

a gas inlet pipe having its inner end positioned below the upper central part of the dome and positioned with the opening thereof directed upward at the upper central part of the inner wall of said dome;

a plurality of gas inlet pipes having nozzles extending into said reaction chamber peripherally positioned around the lower side wall of said dome, said nozzles being directed in a substantially horizontal plane to cause gas ejected from said nozzles to whirl unidirectionally along the inner wall of said dome;

a waste gas exhaust pipe penetrating said reaction chamber for expelling waste gas from the vortex center of the whirling gasses; and a heating section including a heating chamber adjacent to and outside of said reaction chamber.

2. The apparatus of claim 1 wherein said bottom is horizontal and is adapted to have horizontally oriented wafers thereon.

3. The apparatus of claim 2 wherein said inlet gas pipe positioned under said dome is a reaction gas inlet pipe, and wherein said peripherally positioned inlet gas pipes are used to inject carrier gas into said reaction chamber.

4. The apparatus of claim 3 wherein the inner wall of said reaction chamber has a mirror finish; and wherein said heating section is a chamber positioned under said bottom and contains inlet means for injecting a heated gas into said heating chamber.

* * * * *